(12) United States Patent
Damm

(10) Patent No.: US 8,295,186 B2
(45) Date of Patent: Oct. 23, 2012

(54) INDIVIDUAL END-TO-END D/DV/L MEASUREMENT IN IP MULTICAST

(75) Inventor: Gerard Damm, Plano, TX (US)

(73) Assignee: Alcatel Lucent, Paris (FR)

( * ) Notice: Subject to any disclaimer, the term of this patent is extended or adjusted under 35 U.S.C. 154(b) by 478 days.

(21) Appl. No.: 11/536,315

(22) Filed: Sep. 28, 2006

(65) Prior Publication Data

US 2008/0080501 A1    Apr. 3, 2008

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .......................... 370/248; 370/241; 370/352

(58) Field of Classification Search .................... 370/241
See application file for complete search history.

(56) References Cited

U.S. PATENT DOCUMENTS

| | | | |
|---|---|---|---|
| 6,538,997 B1* | 3/2003 | Wang et al. | 370/241 |
| 6,732,182 B1* | 5/2004 | Beverly, IV | 709/230 |
| 7,016,351 B1* | 3/2006 | Farinacci et al. | 370/392 |
| 7,180,856 B1* | 2/2007 | Breslau et al. | 370/230 |
| 7,420,988 B1* | 9/2008 | Grossman | 370/466 |
| 2003/0081625 A1* | 5/2003 | Matsufuru | 370/412 |
| 2003/0206550 A1* | 11/2003 | Shanley | 370/395.1 |
| 2005/0099952 A1* | 5/2005 | Mohan et al. | 370/241 |
| 2007/0025276 A1* | 2/2007 | Zwiebel et al. | 370/256 |
| 2007/0025277 A1* | 2/2007 | Sajassi et al. | 370/256 |

* cited by examiner

*Primary Examiner* — Jay Y Lee
(74) *Attorney, Agent, or Firm* — Hitt Gaines, PC

(57) ABSTRACT

Performance measurements are taken in a data network where information from a source is sent to a set of receivers via a plurality of routers using multicast addressing by generating a performance measurement packet having indicia indicating that the packet is a performance measurement packet at the source. The performance measurement packet is forwarded from the source to a subset of one or more identified receivers over the same respective paths as non-measurement packets. The performance measurement packets are received at the subset of identified receivers, but not at receivers in the set that are not part of the subset.

20 Claims, 2 Drawing Sheets

INDIVIDUAL END-TO-END D/DV/L MEASUREMENT IN IP MULTICAST

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to data network performance measurements and, more particularly, to measuring delay/delay variation/loss (D/DV/L) in an IP multicast network.

2. Description of the Related Art

Multicasting data is used in a variety or circumstances. One of the most important upcoming uses for multicasting is the transmission of multiple channels of live video, sometimes referred to as IPTV. When live video is being sent over a data network using an IP protocol, rather than other transmission media, such as satellite and over-the-air, several quality of service issues arise: (1) L3 (Layer 3) routes (MRIB, Multicast Routing Information Base) may be improperly configured in PIM (Protocol Independent Multicast) routers, (2) L2 (Layer 2) FDB (Forwarding Data Bases) may be incorrect in bridges, (3) there may be a node or link failure and (4) packets may be delayed, or the time between packets may vary (delay variation), or packets can be lost (i.e., sent from the source, but not received at one or more of the receiving devices in a multicast group). Accordingly, there must be a way of testing performance of a data network when a suitable transmission is not being obtained by a specific subscriber.

The ability to quickly and accurately trace problems is of special importance for customer care and troubleshooting in the case of IPTV service offered using multicast: if a subscriber complains about poor QoE (Quality of Experience) when watching a certain channel, the network operator must investigate different areas (network configuration, current congestions or failures, and so on). An additional useful tool would be to test the current D/DV/L performance of a given channel, from its source to that particular receiver. D/DV/L measurements are also important for other multicast services, such as videoconferencing (for which D/DV are important) and file distribution (for which L is important).

Currently, end-to-end solutions at the IP level (layer 3) to measure D/DV/L are categorized as either passive or active. In the passive method, real traffic is observed with external hardware and the observed information is correlated. In an active measurement, unicast measurement traffic (such as IP Performance metrics, or IPPM, specified by the IETF, Internet Engineering Task Force, working group) using timestamps, type and sequence identification fields, plus additional padding, with randomized sending times a padding bits, is injected into the network. The performance measurement packet fields are used to compute D/DV/L performance characteristics, sort them locally and make them available for NM (network management) retrieval. The protocol OWAMP (One-Way Active Measurement Protocol) allows two hosts to negotiate measurement sessions of TCP, and the measurement packets are sent over UDP (User Datagram Protocol).

IPPM is also currently specifying multi-party (one-to-many) metrics, which covers the case of multicast, at the group level (D/DV/L are measured for every receiver in a group, and the information is gathered for the group). One other category of measurement is the use of node implemented counters, but these counters only measure losses, not delays or delay variations.

External hardware for passive measurement solutions is expensive for network monitoring, and especially so for a case-by-case troubleshooting tool. On the other hand, unicast injected traffic in an active measurement solution fails to capture the specific performance of multicast data paths, since unicast packets are likely to be enqueued and processed differently in the network nodes, thus experiencing a QoS (quality of service) which is different from the multicast traffic.

Unicast packets can also be forwarded differently (i.e. follow a different path) in both multicast models—the SSM model (Source-Specific Multicast, with a SPT: Shortest Path Tree) and the ASM model (Any Source Multicast, with a RPT: Rendez-vous Point Tree, possibly extended during operation with dynamically built SPTs), implemented using PIM-SM (Protocol Independent Multicast, Sparse Mode). The topology of a multicast tree depends on the upstream IP path from the listeners to the source (RPF: Reverse Path Forwarding), whereas the D/DV/L performance should be measured downstream from the source to the receivers. In ASM, multicast packets may follow the RPT before an SPT is established, thus resulting in a route possibly very different than the SPT.

The future IPPM multiparty metrics (covering multicast) will allow measurement of average D/DV/L performance within a multicast group, but this will generate excessive traffic if used just for one receiver, since all receivers will be flooded with the performance measurement packets.

Therefore, a need has arisen for a D/DV/L measurement that does not require expensive additional equipment, and which accurately measures D/DV/L for a single receiver without excessive PM traffic.

BRIEF SUMMARY OF THE INVENTION

In the present invention, performance measurements are taken in a data network where information from a source is sent to a set of receivers via a plurality of routers using multicast addressing by generating a performance measurement packet having indicia indicating that the packet is a performance measurement packet at the source. The performance measurement packet is forwarded from the source to a subset of one or more identified receivers over the same respective paths as non-measurement packets. The performance measurement packets are received at the subset of identified receivers, but not at receivers in the set that are not part of the subset.

The present invention provides accurate measurements by using the exact same path as non-measurement packets, but does not send packets to all receivers in the set, which would generate unnecessary traffic.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-4 of the drawings, like numerals being used for like elements of the various drawings.

The present invention performs D/DV/L by sending measurement packets using a unicast-like forwarding process from a source to a receiver using a multicast tree, such that the measurement packets follow the same path as would multicast packets from the source to the receiver. To enable the proper forwarding, a specific multicast group address is reserved for performance measurement; this group address may be standardized or configured by a network operator. The receivers may either all join the performance-measurement group at boot (in which case, they will remain members of the group as long as they are operating), or a permanent static join can be manually performed.

To ensure proper measurements on delay, delay variation and loss, the measurement packets between a source and a receiver follow the exact same path as the multicast data between this same source and this same receiver, including the same device-to-device hops and same queues within each network device, such that the measurement packets experience the same path and the same QoS as the traffic. However, the measurement packets are not replicated at Layer 3 as the multicast packets would be along the path. Also, Layer 2 replication of measurement packets is minimized the same way as other multicast data packets if IGMP (Internet Group Management Protocol) or PIM snooping is implemented in bridges.

Figure 1:
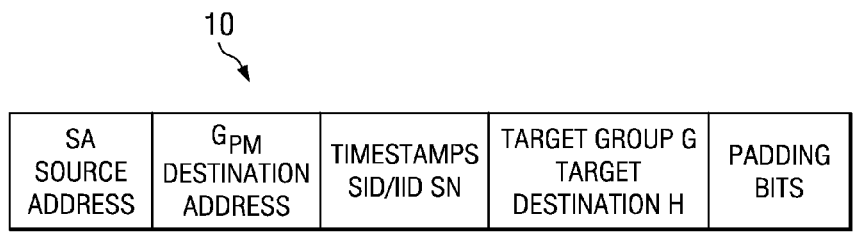
FIG. 1 illustrates a performance measurement packet.

FIG. 1 illustrates an exemplary embodiment of a performance measurement (PM) packet 10, it being understood that many variations and enhancements could be made to the basic structure. The header includes a source address (SA) and a destination address ($G_{PM}$, the reserved group address for individual performance measurement in IP multicast). The payload of the packet includes fields for timestamps (entered just prior to transmission from the source and just upon arrival at the destination), session IDs (SIDs) or interval IDs (IIDs) and sequence number (SN). Additionally, there are fields for a target destination host address (identifying one particular receiver) and target group address (identifying a particular multicast path to the receiver) and padding bits.

Figure 2:
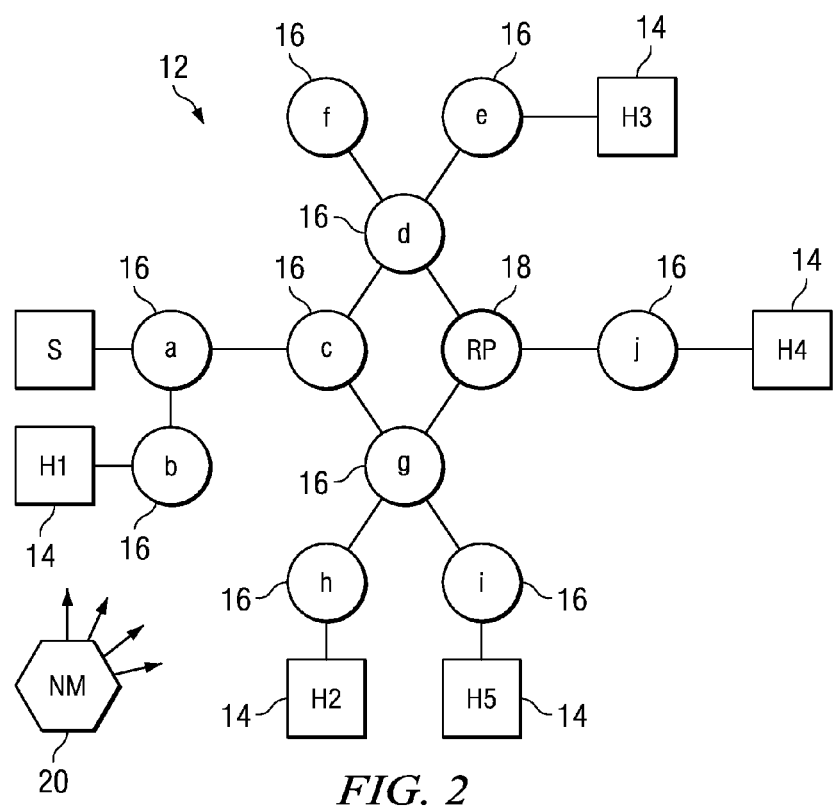
FIG. 2 illustrates a topology of an exemplary network over which the performance measurement packet may be used.

FIG. 2 illustrates an example of a network 12 that can be tested using the present invention. The network includes the source S and multiple receivers (hosts) 14, individual referenced as H1 through H5. Routers 16 are designated as "a" through "j". In FIG. 2, a rendez-vous point (RP) 18 is used to such that the source can send normal traffic to the RP as a unicast packet and the RP 18 will decapsulate the unicast packet and send the information in multicast to the receivers 14. The NM 20 is in communication with the source S, receivers 14 and routers 16.

The present invention can perform individual e2e (end-to-end) measurement in IP multicast; the performance measurement can be performed either using a session-based method like OWAMP, if the receiver has the capability (or if the NM can configure the Source and the Receiver and set up a performance measurement session) or it can be performed using a source-initiated session-less method, wherein the source S initiates (upon NM command) streams of PM packets. As a matter of implementation, the difference in the PM packet will be in the PM packet ID field, which is used either as a session_id or as an interval_id. If a session-based method is used, the session-setup control packets can be exchanged as unicast between Source and Receiver (OWAMP could be used), since control information (as opposed to PM packets) does not need to follow the multicast paths.

In general, only one-way D/DV/L need be measured, since they are the only significant measurement in general (due to path asymmetry), especially in the case of video distribution (need to verify downstream performance). As in all one-way measurement methods, the receiver real-time clock should be synchronized fairly closely with the source real-time clock. The synchronization does not have to be enforced at all times, but simply during a measurement session or interval.

In operation, the Source S will send streams of PM packets (initiated and stopped by NM), following the usual active PM recommendations (similar to IPPM): relatively small load (compared to all the other traffics), randomized sending schedules, randomized padding bits, as accurate as possible time stamping and reporting of calibration error, etc. Each receiver H1-H5 of FIG. 2 identifies PM packets by reference to the special group address in the PM packet; the receivers will have previously joined the group at boot by IGMP, or by static join on the DR (Designated Router), in which case the data will be correctly forwarded by the router on the corresponding interfaces (the Receiver still has to recognize and process the PM packets).

As soon as a Receiver receives a PM packet, it performs the PM processing (essentially, checking the real-time clock time and compute the delay using the sender timestamp), and then it can perform usual performance monitoring activities, such as storing results for NM retrieval (and DV and L computation).

The routers 16 forward PM packets (with destination address $G_{PM}$) sent from a Source S toward a certain target host Ht to measure the performance of a target group G for the target host Ht. Group G is either a shared tree (*,G) with source S or group G is source-based (S,G) directly. Each router 16 (PIM-enabled, if PIM is used for the multicast routing) will check whether it is supposed to send the multicast packet encapsulated in unicast to the RP (Rendez-vous Point) as a PIM Register Packet. If so, it will process the PM packet 10 just like any other multicast packet. Otherwise, it will retrieve the set of outgoing interfaces (OIF) for multicast group (S,G) if possible, or for multicast group (*,G) otherwise, and remove the incoming port if necessary. The router will also list the possible IP paths towards the target receiver Ht (not just the longest prefix match, but all the possible routes since the router does not know the reverse path from the target receiver Ht to the source S). The intersection of these two sets (multicast downstream ports, and IP paths towards Ht) contains the path to be followed by the PM packet 10. If more than one element exists in the intersection, a copy of the PM packet 10 has to be created for each of them. This creates some extra measurement traffic, but the traffic will be terminated (not forwarded) as early as possible by the next nodes, as soon as the intersection for the useless PM packet 10s becomes empty. Only one of the PM packets 10 ultimately reaches Ht. The forwarded PM packets (replicated included) are put in the corresponding multicast outgoing queues, taking target destination Ht, priorities, and so on, into account.

As a result, the main PM packet will follow the same path to Ht and get the same processing as a regular multicast packet, but will not be replicated and will not flood the multicast group. A few extra replicated PM packets may be forked at certain points, but are rapidly terminated.

Pseudo-code describing the operation of the routers in forwarding PM packets is as follows (where text after a "//" string is commentary and "\" notation means that the right hand element is excluded from the left hand element):

```
if (PIM Register Packet)
    send PM packet encapsulated in unicast like normal PIM processing
else
    IPP = lookup(IP-FIB, Ht) // outgoing IP ports for target destination Ht
    OPM = OIF(S,G)\incoming_port // downstream multicast ports for
        // (S,G) i.e., the set OIF(S,G) minus the incoming port if it
        was included
    if intersection(IPP,OPM) is not empty
        put a copy of PM packet in each corresponding multicast queue
        exit
    endif
    OPM = OIF(*,G)\incoming_port // downstream multicast port for (*,G)
        // i.e., the set OIF(*,G) minus the incoming port if it was included
    if intersection(IPP,OPM) is not empty
        put a copy of PM packet in each corresponding multicast queue
        exit
    endif
endif
```

Figure 3:
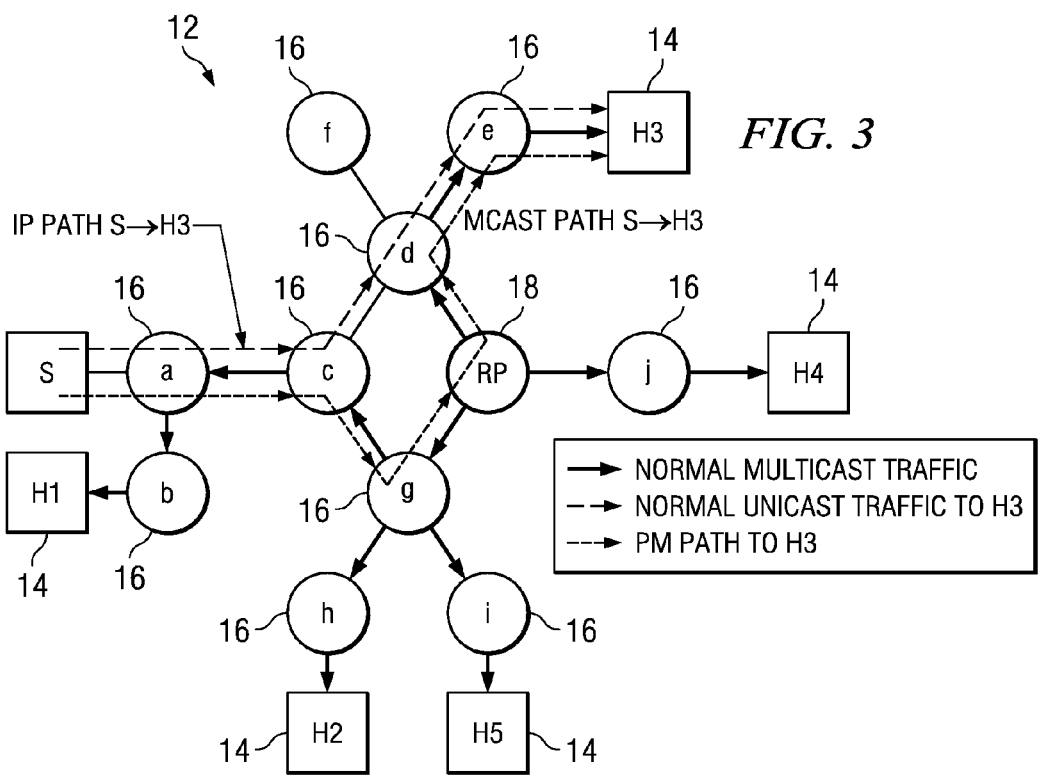
FIG. 3 illustrates paths taken by multicast packets, unicast packets and performance measurement packets for a configuration using a rendezvous point (RP)

FIG. 3 provides an example of the path of a PM packet for the network of FIG. 2 using RPT. In this example, it is assumed that there is a single domain (only one RP in the case of RPT) and that receivers H1 to H5 have joined a multicast group G, and that source S sends data to G. When source S sends multicast data to group G, its designated router a will encapsulate and unicast the packet to the RP 18, which then will decapsulate the packet and send replicates to every port in the OIF, in this case, to routers d, g, and j. Each of these routers repeat the same operation, resulting in the delivery of a copy of the multicast packet to every member H1 to H5.

If the NM starts an individual IP multicast D/DV/L measurement for Source S to receiver H3, for example, the PM packets will be correctly encapsulated and unicast from the source S to the RP 18, then follow the path from RP 18 to router d, to router e, to receiver H3 (RP-d-e-H3) in the multicast queues. By contrast, a unicast IPPM test packet sent from source S to receiver H3 would have followed the shortest IP path from the Source S, i.e S-a-c-d-e-H3, and therefore would have failed to take the RP detour. Thus, if there was a problem in processing or queueing at routers c, g, or RP, or in the links between router c and router g (c-g), or between router g and RP 18 (g-RP), or between RP 18 and router d (RP-d), the problem would not be identified by a unicast PM packet from source S to H3.

Figure 4:
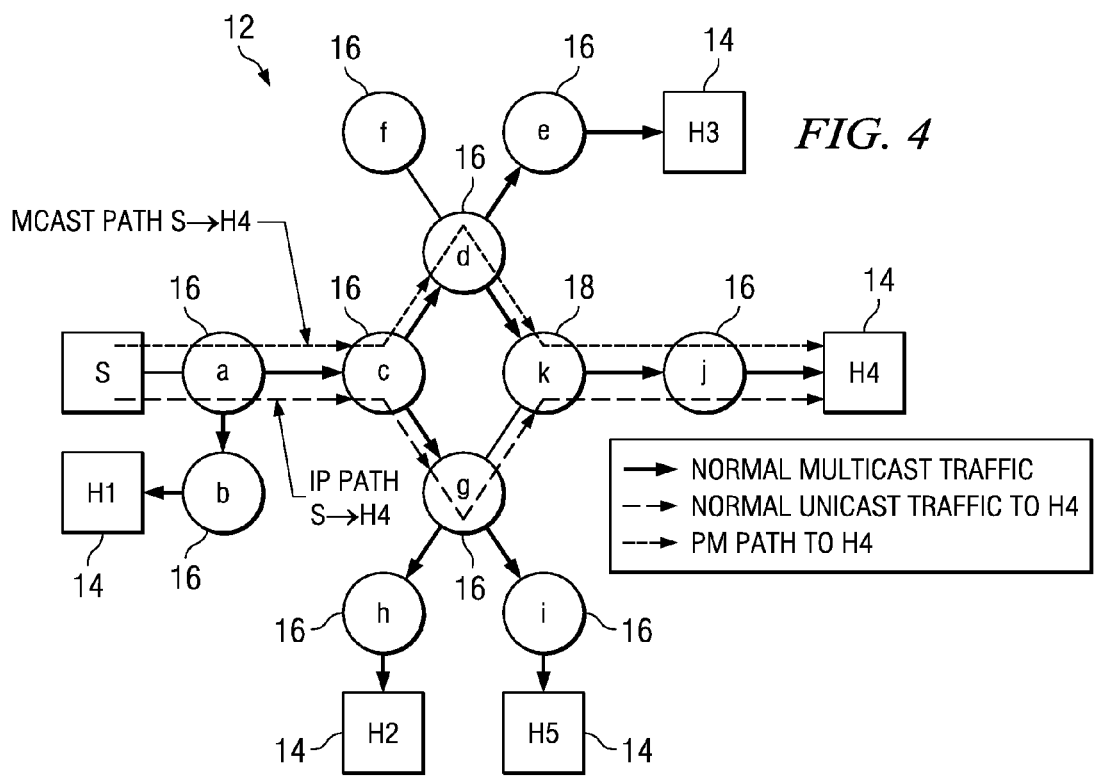
FIG. 4 illustrates paths taken by multicast packets, unicast packets and performance measurement packets for a configuration not using an RP.

FIG. 4 illustrates the path of a PM packet in the case of the SSM model, or the ASM optimization (phase 3 of PIM-SMv2, where SPTs may be created dynamically). In this case, the router formerly shown as "RP" is renamed router k, because it no longer acts as a rendez-vous point. Multicast packets follow the SPT of a specific source instead of the RPT (to avoid the encapsulation/decapsulation operation, as well as a possibly long detour via RP). The SPT of this example is rooted at a, the DR of S.

In the SPT case shown in FIG. 4, when source S sends normal multicast data to group (S,G), its DR a will replicate the packets to the OIF(S,G), i.e. in this case to neighbors b and c. Each of them will repeat the same operation, and a copy of the multicast packet will be delivered to each host H1 to H5, following the shortest reverse paths (i.e. from listeners to S), with minimal last-moment replication.

Since it is possible for the IP path from source S to a target H to be different from the IP path from H to S, a classic IPPM-like PM packet could follow a different path than the one to be measured. For instance, the correct downstream multicast path from S to H4 is S-a-c-d-k-j-H4 (was built by the Joins from H4), whereas the IP path from S to H4 could be S-a-c-g-k-j-H4. Once again, this demonstrates that a unicast packet from source S to target receiver H4 could follow a different path than multicast packets from the Source S to the group including receiver H4, rendering inaccurate results. Using the present invention, however, one of the PM packets will necessarily follow the correct downstream multicast path, and experience the correct multicast processing and queuing along the way. In the illustrated example, an extra replicated PM packet 10 would be created at router c, since there are two IP paths towards H4 at that router: c-d and c-g (where "c-d" and "c-g" represent the path between routers c and d and the path between routers c and g, respectively). In this case, c-g happens to be the preferred IP path towards H4, and also happens to be in the multicast downstream ports because of other listeners (H2 and H5). Thus, at router c, the intersection of the IP paths towards the target host and the downstream multicast paths at router c is {c-d,c-g}∩{c-d,c-g}={c-d, c-g}, and, accordingly, duplicate packets are sent on both c-d and c-g. The PM packet 10 on c-d will continue to H4 from router d because the intersection of IP paths towards the target host (H4) and the multicast paths at router d is {d-k}∩{d-k,d-e}={d-k}. On the other hand the duplicated PM packet 10 for the target host sent on c-g will be terminated at router g, since the intersection of the IP paths from router g to the target host (H4) and the downstream multicast paths at router g will be empty: {g-k}∩{g-h,g-i}=∅.

In either of the cases shown in FIGS. 3 and 4, the packets arriving at the target receiver will follow the exact path followed by the normal multicast traffic packets. At the target receiver, the packets are timestamped and the delay can be determined as the difference between the source timestamp and the receiver timestamp. The delay variation can be computed from the delay values. Losses can be determined from packets that are not received by the target receiver.

Accordingly, the present invention calculates D/DV/L measurements that are accurate with regard to the path taken by normal multicast traffic. Unlike other solutions, however, the measurement packets are restricted to a specific Source-Receiver, so traffic is not generated between the Source and other receivers that are not under test. This information can be very useful in pinpointing and troubleshooting performance issues. Other tests such as reordering, bandwidth, and so on could also be performed. The performance measurement packets could be timestamped at each router in the path between the source and target receiver for additional analysis.

The invention can be implemented on a network with only minor modifications to the routers to recognize PM packets by the PM group address and properly forward the PM packets.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A method of performance measurement in a data network where a non-measurement packet from a source is sent to a group of receivers via a plurality of routers over predetermined downstream multicast paths, comprising the steps of:

generating a performance measurement packet having indicia indicating that the packet is a performance measurement packet, wherein said generating step is performed at the source upon initiation by a network management node;

forwarding the performance measurement packet from the source to an identified target receiver in the group, without sending the performance measurement packet from the source to all the receivers in the group, utilizing the same router to router hops and the same queues within each router of the plurality of routers to traverse the same downstream multicast path in the same order as the non-measurement packet sent from the source to the target receiver; and receiving the performance measurement packet at the target receiver.

2. The method of claim 1 wherein said receiving step includes the step of timestamping the performance measurement packet at the time that the performance measurement packet is received at the target receiver wherein the performance measurement packet has a source address field, destination address field, timestamp field, session ID (SID) field, interval ID (IID) field, sequence number (SN) field, target group address field, target destination host address field and padding bits field.

3. The method of claim 2 further comprising the step of computing a delay calculation upon receiving a performance measurement packet and wherein forwarding the performance measurement packet from the source to the identified target receiver without sending the performance measurement packet from the source to all the receivers in the group involves forwarding the performance measurement packet from the source to only the identified target receiver without sending the performance measurement packet from the source to any other receiver in the group.

4. The method of claim 3 further comprising the step of computing a delay variation calculation responsive to multiple received performance measurement packets at the target receiver.

5. The method of claim 1 further comprising the step of detecting lost performance measurement packets at the target receiver.

6. The method of claim 1 wherein said indicia is a predetermined performance measurement group address, and each of the receivers in the group joins the performance measurement group.

7. The method of claim 1 wherein said forwarding step comprises, at each router receiving a performance management packet, the steps of:

determining an intersection of IP paths towards the target receiver and the downstream multicast paths in response to receiving a performance measurement packet; and forwarding a copy of the performance measurement over each path in the intersection.

8. The method of claim 7 further comprising the step of terminating a received performance measurement packet if the intersection between the IP paths and the downstream multicast paths is empty.

9. The method of claim 1 wherein the performance measurement packet is sent from the source to a rendez-vous point encapsulated as a unicast packet, wherein the performance measurement packet is decapsulated and sent from the rendez-vous point to the target receiver.

10. The method of claim 1 wherein said data network is an IP network.

11. A network including a source for sending a non-measurement packet to a group of receivers via a plurality of routers over predetermined downstream multicast paths, comprising:

circuitry in the source for generating a performance measurement packet upon initiation by a network management node, the performance measurement packet having indicia indicating that the packet is a performance measurement packet and indentifying a target receiver in the group;

circuitry in the routers for forwarding the performance measurement packet to the target receiver over the same downstream multicast path and in the same order as the non-measurement packet sent from the source to the target receiver, without sending the performance measurement packet from the source to all the receivers in the group, wherein said forwarding utilizes the same router to router hops and the same queues within each router; and circuitry in the target receiver for receiving the performance measurement packet.

12. The network of claim 11 wherein said receiving circuitry includes circuitry for timestamping the performance measurement packet at the time that the performance measurement packet is received at the target receiver.

13. The network of claim 12 wherein said receiving circuitry includes circuitry for computing a delay calculation upon receiving a performance measurement packet.

14. The network to claim 13 wherein said receiving circuitry includes circuitry for computing a delay variation calculation responsive to multiple received performance measurement packets at the target receiver.

15. The network of claim 11 wherein said receiving circuitry includes circuitry for detecting lost performance measurement packets at the target receiver.

16. The network of claim 11 wherein said indicia is a predetermined performance measurement group address, and each of the receivers in the group joins the performance measurement group.

17. The network of claim 16 wherein said forwarding circuitry comprises circuitry for:

determining an intersection of IP paths towards the target receiver and the downstream multicast paths in response to receiving a performance measurement packet; and forwarding a copy of the performance measurement over each path in the intersection.

18. The network of claim 17 wherein said receiving circuitry further comprising circuitry for terminating the received performance measurement packet if the intersection between the IP paths and the downstream multicast paths is empty.

19. The network of claim 11 wherein one of the plurality of routers comprises a rendez-vous point, wherein the performance measurement packet are sent from the source to the rendez-vous point encapsulated as a unicast packet and the performance measurement packet is decapsulated from the unicast packet and sent from the rendez-vous point to the target receiver.

20. The network of claim 11 wherein said network is an IP network.

* * * * *